Jan. 12, 1954    E. F. BACON    2,665,584
PRESSURE GAUGE
Filed Sept. 24, 1949

Inventor
Elbridge F. Bacon
By Willits, Helmig & Baillio
Attorneys

Patented Jan. 12, 1954

2,665,584

UNITED STATES PATENT OFFICE 2,665,584

PRESSURE GAUGE

Elbridge F. Bacon, Flint, Mich., assignor to General Motors Corporation, Detroit, Mich., a corporation of Delaware Application September 24, 1949, Serial No. 117,665

2 Claims. (Cl. 73—411)

1

The present invention relates generally to pressure gauges and more particularly to certain improvements in gauges of the Bourdon tube type.

One object of the invention is to provide a gauge of this type especially adapted for use under heavy vibration conditions which is both simple in construction and efficient and accurate in operation.

A further object is to provide an improved arrangement and construction to facilitate the initial calibration of the gauge. As will be more fully described herein, a link extends between the Bourdon tube and a lever arm on a pivoted U-shaped pointer frame and this arm is capable of substantially straight line adjustment to move the link pivot point toward or away from the center line of the pointer frame pivots.

Other objects and features of the present invention will be apparent from the following description of the embodiment shown in the accompanying drawings.

Figure 1:
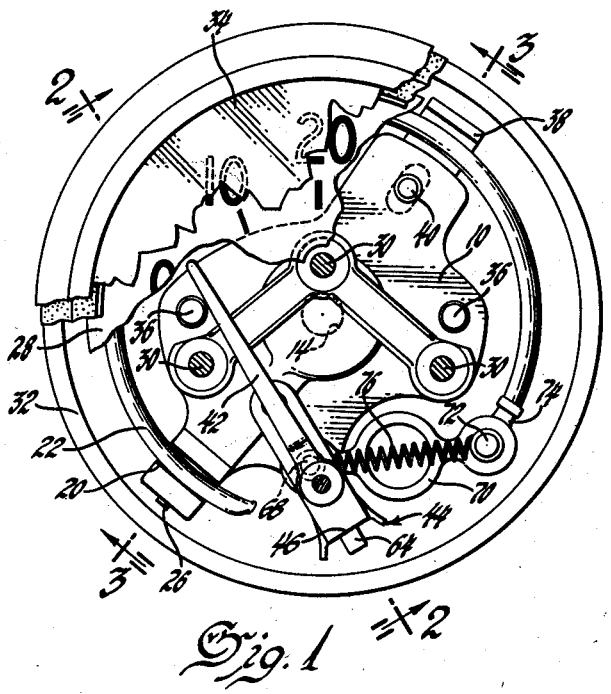
Fig. 1 is a face view of the gauge with portions broken away to show the operating mechanism.

The present gauge is shown as including a main frame 10 having a central, rearwardly extending, externally threaded boss 12 with a longitudinal supply passage 14 to receive a pulsation restricting tube 16. A headed pin 18 is loosely carried in this tube and adapted to vibrate or move to some extent to dislodge any foreign material that might tend to clog the restricted passageway between the pin and tube.

The frame 10 is provided with a projection having a forwardly opening channel 20 to receive the closed fixed end of a Bourdon tube 22 which may be soldered to the frame within this channel. To place the interior of the Bourdon tube in communication with the supply passage 14, the frame may be conveniently drilled to provide a cross passage 24 with the drill passing through the tube 22 and the open end of the drilled passage then closed by a plug 26.

The usual dial 28 is supported on and secured to forwardly extending bosses on the frame 10 by three spaced screws 30 and the gauge casing 32 which encloses the operating mechanism and

2 mounts the front cover glass 34 is secured to the frame 10 by screws 36. An angle bracket 38 is also secured to frame 10 by a screw 40 with one arm of this bracket slotted, as shown, to receive the screw 40 while the other arm of the bracket extends over an intermediate portion of the Bourdon tube 22 to constitute an adjustably mounted stop adapted to be engaged by the tube to modify the expansion thereof and provide a greater amplitude of movement of the pointer connected to the free end of the tube at low pressures than at high pressures.

The pointer 42 is preferably integral with a U-shaped pointer frame indicated generally at 44 which is formed with a base portion 46 and spaced parallel legs 48 and 50. The pointer frame 44 is mounted for swinging movement between the main frame 10 and dial 28, as shown in Fig. 2, by a bushing 52 in leg 48 journaled on a fulcrum pin 54 riveted to frame 10 and a similar bushing 56 in leg 50 journaled on a fulcrum pin 58 riveted to dial 28.

Figure 2:
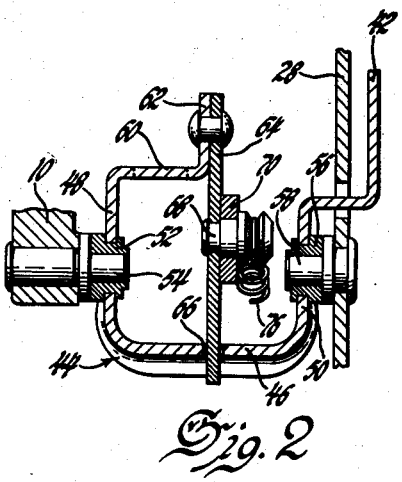
Fig. 2 is a fragmentary section taken substantially on line 2—2 of Fig. 1.
Figure 3:
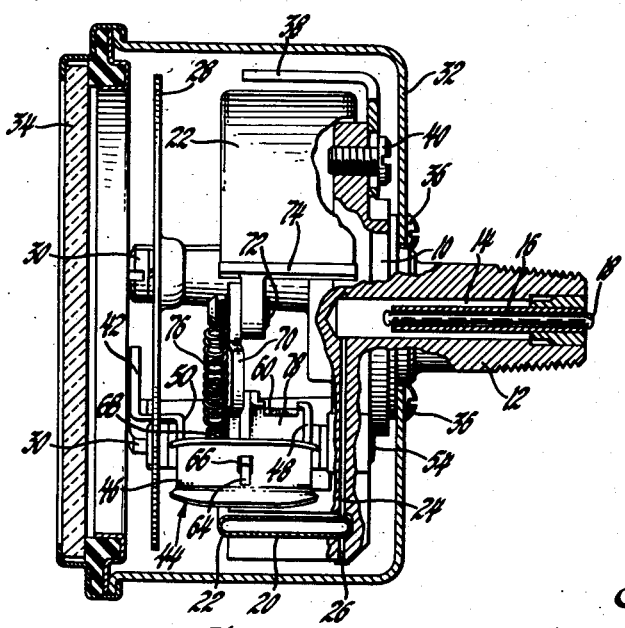
Fig. 3 is a view on line 3—3 of Fig. 1 with parts in elevation.
Figure 4:
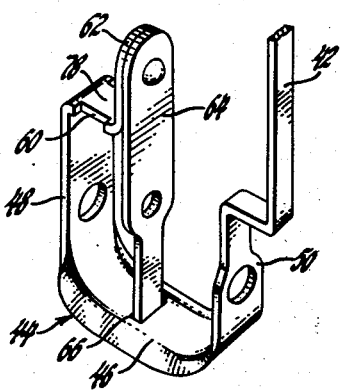
Fig. 4 is a fragmentary, detached perspective of a portion of the pointer frame and the calibrating arm.

Proceeding now to the connection of the Bourdon tube to the pointer frame and the arrangement and construction to provide for calibration, the leg 48 of pointer frame 44 is shown in Figs. 2 and 4 as provided with a bendable arm 60 which extends substantially parallel to the base portion 46 with its extremity 62 bent upwardly and riveted to a lever arm 64. The lever arm 64 extends donwnwardly between and substantially parallel to the legs 48 and 50 with the free end of this arm extending through a guide slot 66 in the base portion 46.

A pivot post 68 is riveted to the lever arm 64 between the ends thereof and one end of a link 70 is journaled on post 68 with the other end of this link pivotally connected to the free end of the Bourdon tube 22 by a pivot post 72 riveted to an end piece 74 which is soldered to the tube with a spring 76 extending between the pivot posts 68 and 72 to take up any play or blacklash in the link pivot joints.

It will be noted that the pivotal connection of link 70 to lever arm 64 is offset with respect to the center of the fulcrum pins 54 and 58 on which the pointer frame 44 is pivotally mounted, and the gauge can be initially calibrated by adjusting the extent of this offset to thereby vary the ratio of movement between the end of the Bourdon tube and the pointer frame 44.

This adjustment is adapted to be made by bending the arm 60 which is provided with an intermediate portion 78 of reduced cross section to facilitate bending only at this portion so as not to warp other portions of the pointer frame during the calibrating operation. By reason of the extension of lever arm 64 through the guide slot 66 in the base portion of the pointer frame it will be seen that as the arm 60 is slightly bent at its reduced portion 78 the lever arm 64 will move substantially in a straight line or path to thereby permit such relatively slight adjustment of the link pivot post 68 as may be required for proper calibration without binding of the pivot mounting of the link on this post.

It will be apparent from the foregoing description that the present gauge can be readily calibrated without imposing undue strain on the pointer frame and the several pivot points of the frame and link. The entire gauge is simple in construction and severe tests under heavy vibration conditions have shown an oil pressure gauge having this construction to be exceptionally durable and accurate in operation.

Although only a single embodiment has been shown and described herein, it will be understood that modifications and minor changes in details of construction will be obvious to those skilled in the art and are contemplated as within the scope of the present invention as set forth in the claims appended hereto.

I claim:

1. In a pressure gauge having a Bourdon tube, a substantially U-shaped pointer frame pivotally mounted in the gauge by axially aligned pivots in the legs of said frame, a lever arm adjustably carried by said pointer frame and extending between and substantially parallel to the legs of said frame, a pivot on said lever arm, a link between said Bourdon tube and said lever arm pivot, and a guide slot in the base of said pointer frame receiving the free end of said lever arm to limit relative movement between said lever arm and said pointer frame during adjustment of said lever arm to vary the axis of the lever arm pivot relative to the pivot axis of the pointer frame.

2. In a pressure gauge having a Bourdon tube, a substantially U-shaped pointer frame pivotally mounted in the gauge by axially aligned pivots in the legs of said frame, a lever arm extending between and substantially parallel to the legs of said frame, an adjustable bendable connection between one of said legs and one end of said lever arm, a pivot on said lever arm intermediate the ends thereof, a link between said Bourdon tube and said lever arm pivot, and a guide opening in the base of said pointer frame with the free end of said lever arm extending through said opening.

ELBRIDGE F. BACON.

References Cited in the file of this patent

UNITED STATES PATENTS

| Number | Name | Date |
|---|---|---|
| 1,480,684 | Hudson | Jan. 15, 1924 |
| 1,922,616 | Chisholm | Aug. 15, 1933 |
| 1,937,928 | Wedin | Dec. 5, 1933 |
| 1,987,673 | Ferrier | Jan. 15, 1935 |
| 2,265,045 | Pfeiffer | Dec. 2, 1941 |

FOREIGN PATENTS

| Number | Country | Date |
|---|---|---|
| 562,097 | Great Britain | June 19, 1944 |